United States Patent
Bansal et al.

(10) Patent No.: US 11,093,350 B2
(45) Date of Patent: Aug. 17, 2021

(54) METHOD AND SYSTEM FOR AN OPTIMIZED BACKUP DATA TRANSFER MECHANISM

(71) Applicant: EMC IP Holding Company LLC, Hopkinton, MA (US)

(72) Inventors: Aaditya Rakesh Bansal, Bangalore (IN); Sunil Yadav, Bangalore (IN); Shelesh Chopra, Bangalore (IN); Manish Sharma, Bangalore (IN); Soumen Acharya, Bangalore (IN); Sudha Vamanraj Hebsur, Bangalore (IN); Hareej G. Hebbur, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/167,365

(22) Filed: Oct. 22, 2018

(65) Prior Publication Data
US 2020/0125459 A1  Apr. 23, 2020

(51) Int. Cl.
*G06F 11/14* (2006.01)

(52) U.S. Cl.
CPC ...... *G06F 11/1484* (2013.01); *G06F 11/1435* (2013.01); *G06F 11/1451* (2013.01); *G06F 11/1456* (2013.01); *G06F 11/1464* (2013.01); *G06F 11/1469* (2013.01); *G06F 2201/815* (2013.01); *G06F 2201/84* (2013.01)

(58) Field of Classification Search
CPC ............. G06F 11/1446–1469; G06F 2201/84
See application file for complete search history.

(56) References Cited

U.S. PATENT DOCUMENTS

| | | | |
|---|---|---|---|
| 6,542,975 B1 * | 4/2003 | Evers | G06F 11/1458 711/112 |
| 8,719,286 B1 * | 5/2014 | Xing | G06F 11/1451 707/755 |
| 9,292,520 B1 * | 3/2016 | Madiraju Varadaraju | G06F 11/1451 |
| 9,658,926 B1 * | 5/2017 | Kulkarni | G06F 11/1466 |
| 9,690,809 B1 * | 6/2017 | Chai | G06F 16/21 |
| 2014/0365740 A1 * | 12/2014 | Vasilyev | G06F 11/1438 711/162 |

* cited by examiner

*Primary Examiner* — Nicholas J Simonetti
(74) *Attorney, Agent, or Firm* — Chamberlain, Hrdlicka, White, Williams & Aughtry

(57) ABSTRACT

A method for processing backup generation requests includes receiving a backup generation request; in response to receiving the backup generation request: identifying a backup to transfer to a backup storage, the backup includes data blocks; performing a data allocation analysis on the backup to generate an offset table; dividing, based on at least the offset table, the backup into sub-portions, each of the sub-portions includes at least one of the data blocks; and transferring, using at least two data streams, at least two of the sub-portions to a backup storage.

20 Claims, 8 Drawing Sheets

METHOD AND SYSTEM FOR AN OPTIMIZED BACKUP DATA TRANSFER MECHANISM

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing, storage, and network use. The utilization of the aforementioned computing resources to generate backups may impact the overall performance of the computing resources.

SUMMARY

In one aspect, a method for processing backup generation requests in accordance with one or more embodiments of the invention includes receiving a backup generation request; in response to receiving the backup generation request: identifying a backup to transfer to a backup storage, the backup includes data blocks; performing a data allocation analysis on the backup to generate an offset table; dividing, based on at least the offset table, the backup into sub-portions, each of the sub-portions includes at least one of the data blocks; and transferring, using at least two data streams, at least two of the sub-portions to a backup storage.

In one aspect, a system for processing backup generation requests in accordance with one or more embodiments of the invention includes a production host executing a virtual and a backup storage configured to store backups. The production host receives a backup generation request; in response to receiving the backup generation request: identifies a backup to transfer to the backup storage, the backup includes data blocks; performs a data allocation analysis on the backup to generate an offset table; divides, based on at least the offset table, the backup into sub-portions, each of the sub-portions includes at least one of the data blocks; and transferring, using at least two data streams, at least two of the sub-portions to the backup storage.

In one aspect, a non-transitory computer readable medium in accordance with one or more embodiments of the invention includes computer readable program code, which when executed by a computer processor enables the computer processor to perform a method. The method includes receiving a backup generation request; in response to receiving the backup generation request: identifying a backup to transfer to a backup storage, the backup includes data blocks; performing a data allocation analysis on the backup to generate an offset table; dividing, based on at least the offset table, the backup into sub-portions, each of the sub-portions includes at least one of the data blocks; and transferring, using at least two data streams, at least two of the sub-portions to a backup storage.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
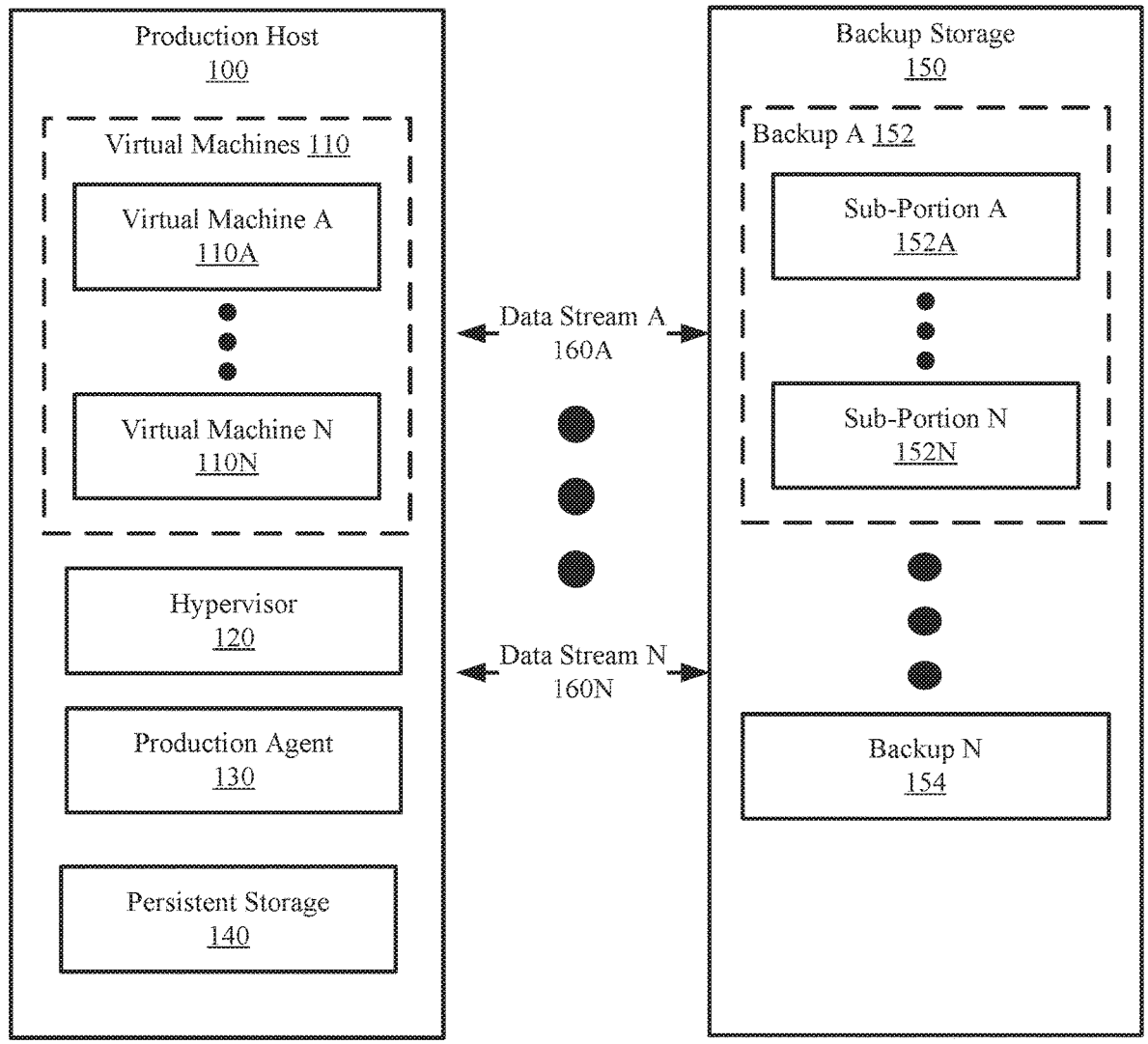
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for providing backup services in a distributed environment. Specifically, embodiments of the invention may provide a method for parallelizing the process of transmitting and storing backups in backup storages as part of the provided backup services. For example, a generated backup may be divided into multiple portions. These portions may be transmitted to and stored in a backup storage in a parallel or partially overlapping in time manner. By doing so, embodiments of the invention may reduce the quantity of time required to provide backup services in a distributed environment in which generated backups are large in size.

Further embodiments of the invention may provide a method for allocating data of a backup into multiple portions. The method may allocate the data in a manner that reduces the physical computing resources and/or time required to send and store the backup in backup storage when compared to contemporary methods. Thus, embodiments of the invention may provide an improved method of providing backup services in a distributed environment when compared to contemporary methods of providing backup services.

FIG. 1 shows an example system in accordance with one or more embodiments of the invention. The system includes a production host (100) and a backup storage (150) connected by two or more of data streams (160A, 160N). Each component of the system of FIG. 1 may be operably connected via any combination of wired and/or wireless connections. Each component of the system is discussed below.

In one or more embodiments of the invention, the production host (100) hosts virtual machines (110). The virtual machines (110) may be logical entities executed using computing resources (not shown) of the production host (100). Each of the virtual machines (110A, 110N) may be performing similar or different processes. In one or more embodiments of the invention, the virtual machines (110) provide services to users, e.g., clients (not shown). For example, the virtual machines (110) may host instances of databases, email servers, and/or other applications. The virtual machines (110) may host other types of applications without departing from the invention. In one or more embodiments of the invention, the virtual machines (110A, 110N) issue input/output (I/O) requests to store data in a persistent storage (140).

In one or more of embodiments of the invention, the virtual machines (110A, 110N) are implemented as computer instructions, e.g., computer code, stored on a persistent storage (e.g., on the production host) that when executed by a processor(s) of the production host (100) cause the production host (100) to provide the functionality of the virtual machines (110A, 110N) described throughout this application.

In one or more embodiments of the invention, the production host (100) includes a hypervisor (120) that orchestrates the operation of the virtual machines (110). The hypervisor (120) may orchestrate the operation of the virtual machines (110A, 110N) by allocating computing resources to each of the virtual machines (110A, 110N).

In one or more embodiments of the invention, the hypervisor (120) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (120) described throughout this application.

In one or more of embodiments of the invention, the hypervisor (120) is implemented as computer instructions, e.g., computer code, stored on a persistent storage that when executed by a processor of the production host (100) causes the production host (100) to provide the functionality of the hypervisor (120) described throughout the application.

In one or more embodiments of the invention, the production host (100) includes a production agent (130). The production agent (130) controls, directly or indirectly, the operation of the production host (100) and/or applications executing thereon. In particular, the production agent (130) provides an interface between the computing resources on the host computing system and other components executing on the production host (e.g., the hypervisor (120), virtual machine A (110A), virtual machine N (110N), etc. one or more embodiments of the invention, the production agent (130) includes functionality for generating a backup and dividing the backup into one or more smaller portions, which may be sent to a backup storage (150) through the data streams (160A, 160N). In one embodiment of the invention, the production agent includes functionality to generate and transmit the backup in accordance with FIGS. 3A-3C.

In one or more of embodiments of the invention, the production agent (130) is implemented as computer instructions, e.g., computer code, stored on a persistent storage that when executed by a processor of the production host (100) cause the production host (100) to provide the functionality of the production agent (130).

In one or more embodiments of the invention, the persistent storage (140) is a storage device that stores data structures. The persistent storage (140) may be a physical or virtual device. For example, the persistent storage (140) may include solid state drives, solid state drives, tape drives, and other components to provide data storage functionality. Alternatively, the persistent storage (140) may be a virtual device that utilizes the physical computing resources of other components to provide data storage functionality. For additional details regarding the persistent storage, refer to FIG. 2.

In one or more embodiments of the invention, the backup storage (150) stores data and/or provides stored data. The data may be, for example, backups (152, 154). The backups (152, 154) may be representations of data generated by, or otherwise associated with, the virtual machines (110). The backups (152, 154) may be used to restore virtual machines to prior states. The backup storage (150) may obtain the backups (152, 154) from the production host (100). The backup storage (150) may store additional data without departing from the invention.

In one or more embodiments of the invention, one or more of the backups (152, 154) include sub-portions (152A, 152N). Each sub-portion (152A, 152N) may include a portion of data from the corresponding backup (152, 154) obtained from the production host (100) through a data stream (160A, 160N).

Figure 5:
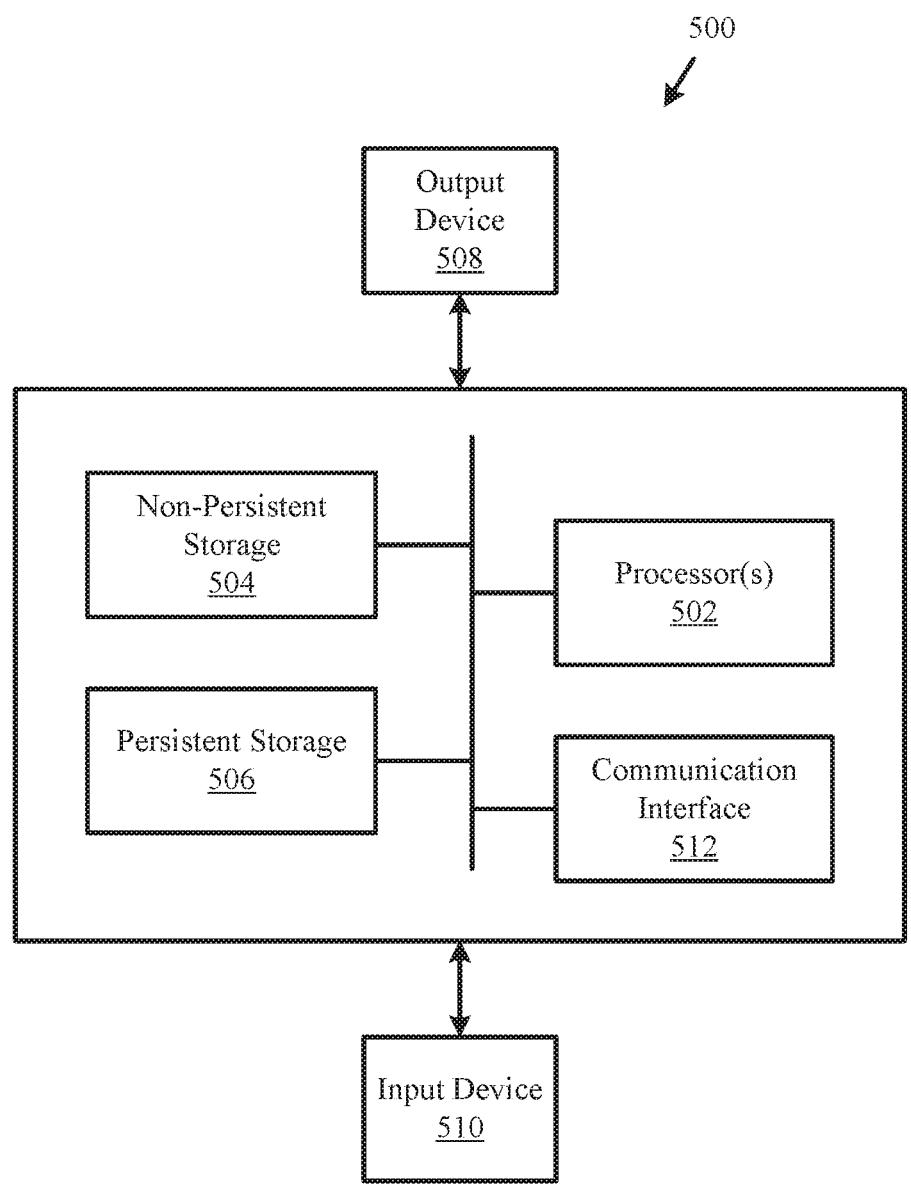
FIG. 5 shows a diagram of a computing device in accordance with one or more embodiments of the invention.

In one or more embodiments of the invention, the backup storage (150) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage (150) described throughout this application.

In one or more embodiments of the invention, the backup storage (150) is implemented as a logical device. The logical device may utilize the computing resources of any number of computing devices and thereby provide the functionality of the backup storage (150) described throughout this application.

Figure 2:
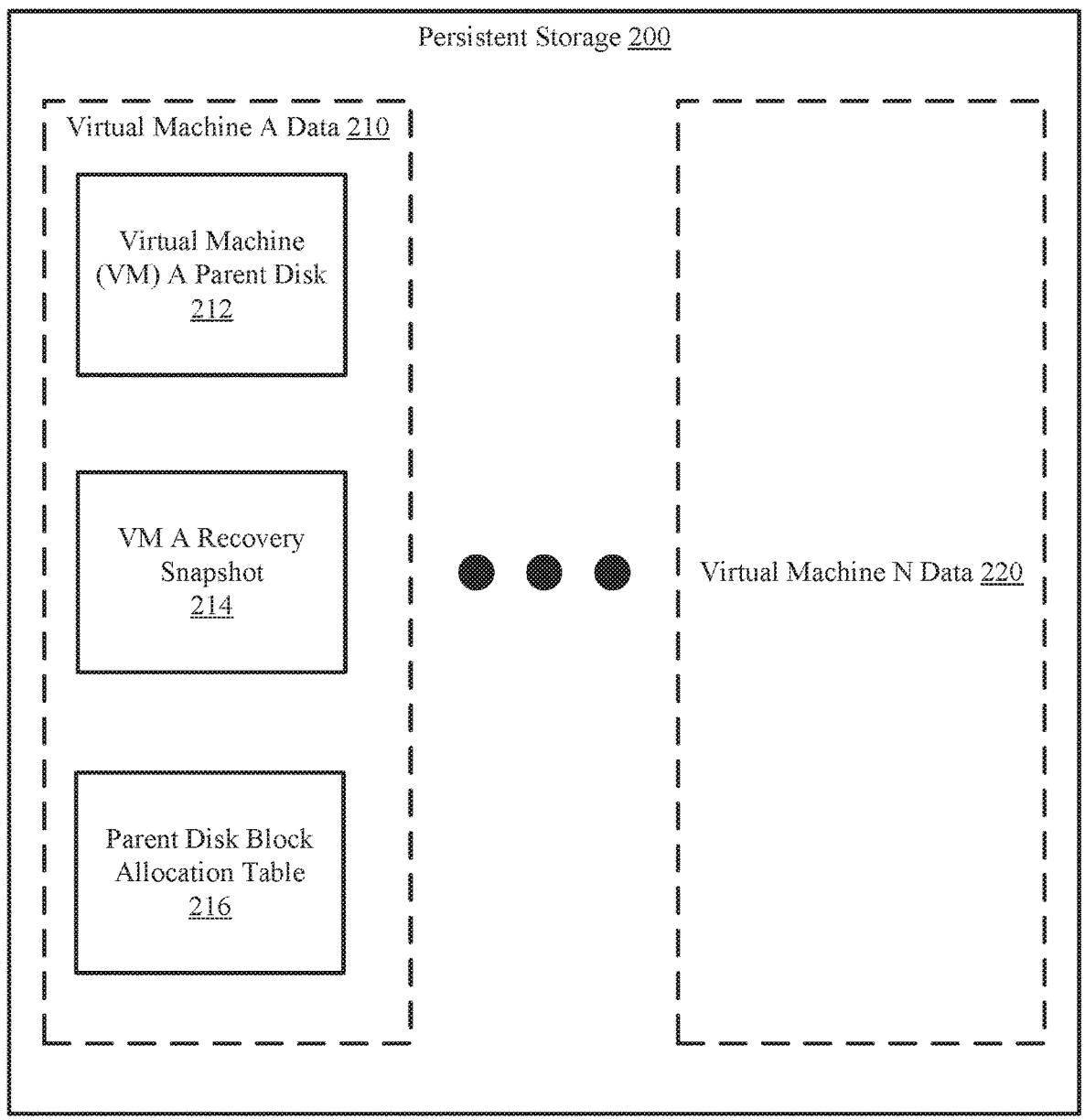
FIG. 2 shows a diagram of a persistent storage of a production host in accordance with one or more embodiments of the invention.

FIG. 2 shows a diagram of a persistent storage (200) of a production host in accordance with one or more embodiments of the invention. The persistent storage (200) may be similar to the persistent storage (140, FIG. 1) discussed above. As discussed above, the persistent storage (200) may store data used by a production agent. The data may include virtual machine data (210, 220) for one or more virtual machines. The virtual machine data for a given virtual machine may include a virtual machine (VM) parent disk (212), a VM recovery snapshot (214), and a parent disk block allocation table (216). Each of these components is discussed below.

In one or more embodiments of the invention, the VM parent disk (212) is a data structure that stores data generated by a virtual machine during a particular period of time (e.g., from a first time to a second time). The VM parent disk (212) may include data blocks in which data is written and stored. The VM parent disk (212) may be set to read-only mode, during which data blocks may not be added, modified, and/or deleted from the VM parent disk (212).

In one or more embodiments of the invention, the VM recovery snapshot (214) is a data structure that stores changes made to the VM parent disk (212) during a period of time after the generation of the VM parent disk (212). In other words, the VM recovery snapshot (214) may store data blocks of the VM A Data (210) that were added, modified, and/or deleted with respect to the VM parent disk (212) during a time period after the VM parent disk (212) went to read-only mode.

In one or more embodiments of the invention, the parent disk block allocation table (216) is a data structure that stores allocation information about data blocks in the VM parent disk (212). The allocation information may specify a logical location (e.g., a logical address) of the data blocks in the persistent storage (200). The parent disk block allocation table (216) may include entries. Each entry may specify a data block of the VM parent disk (212) and allocation information about the data block.

While the various steps in the following flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3C may be performed in parallel with any other steps shown in FIGS. 3A-3C without departing from the scope of the invention.

Figure 3A:
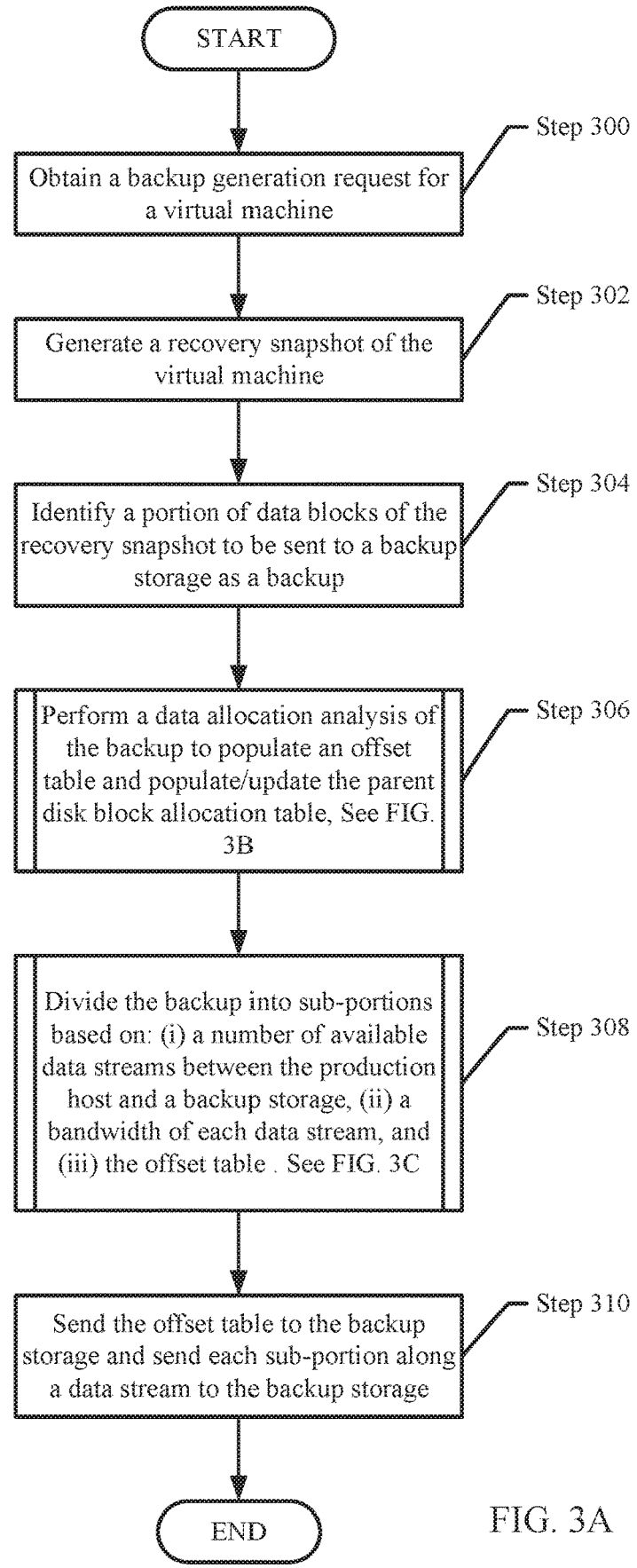
FIG. 3A shows a flowchart for performing a backup in accordance with one or more embodiments of the invention.

FIG. 3A shows a flowchart for performing a backup in accordance with one or more embodiments of the invention. The method shown in FIG. 3A may be performed by, for example, a production agent (130, FIG. 1). Other components of the system illustrated in FIG. 1 may perform the method of FIG. 3A without departing from the invention.

Turning to FIG. 3A, in Step 300, a backup generation request for a virtual machine is received by the production agent. In one or more embodiments of the invention, the backup generation request is issued, for example, by a client sending the request to the production host.

In Step 302, in response to receiving the backup generation request, a recovery snapshot of the virtual machine is generated. The recovery snapshot may be generated after placing a parent disk of the virtual machine in read-only mode and writing all subsequently received data of the virtual machine to the recovery snapshot.

In Step 304, a portion of data blocks of the recovery snapshot that is to be sent to a backup storage is identified as a backup. In one or more embodiments of the invention, the portion of data blocks includes data blocks of the virtual machine that have not been previously sent to the backup storage. The production agent may perform a method of deduplication to identify the portion of data blocks.

In one or more embodiments of the invention, the production agent generates a copy of each data block that is identified as not being previously sent to the backup storage. The copy of data blocks may be the collectively referred to as "the backup".

In one or more embodiments of the invention, the portion of the data blocks are identified using a parent disk block allocation table associated with the virtual machine. For example, the parent disk block allocation table may specify which blocks include valid data. Blocks including valid data may be identified as the portion of the data blocks.

In Step 306, a data allocation analysis of the backup is performed to update the offset table and the parent disk block allocation table. The data allocation analysis may be performed by processing each data block of the backup to identify the allocation of the data block relative to the parent disk and/or allocating a block in the parent disk if the data block is not already present. As discussed above, data blocks for a virtual machine may be added and/or modified at a time period after the parent disk is in read-only mode. If a data block of the backup is a modification of a data block of the parent disk, then an entry corresponding to the data block may already exist in the parent disk block allocation table. In contrast, if the data block of the backup is an addition to the parent disk (e.g., not a modification of an existing data block in the parent disk), there may not be any corresponding entry for such a data block in the parent disk block allocation table.

Figure 3B:
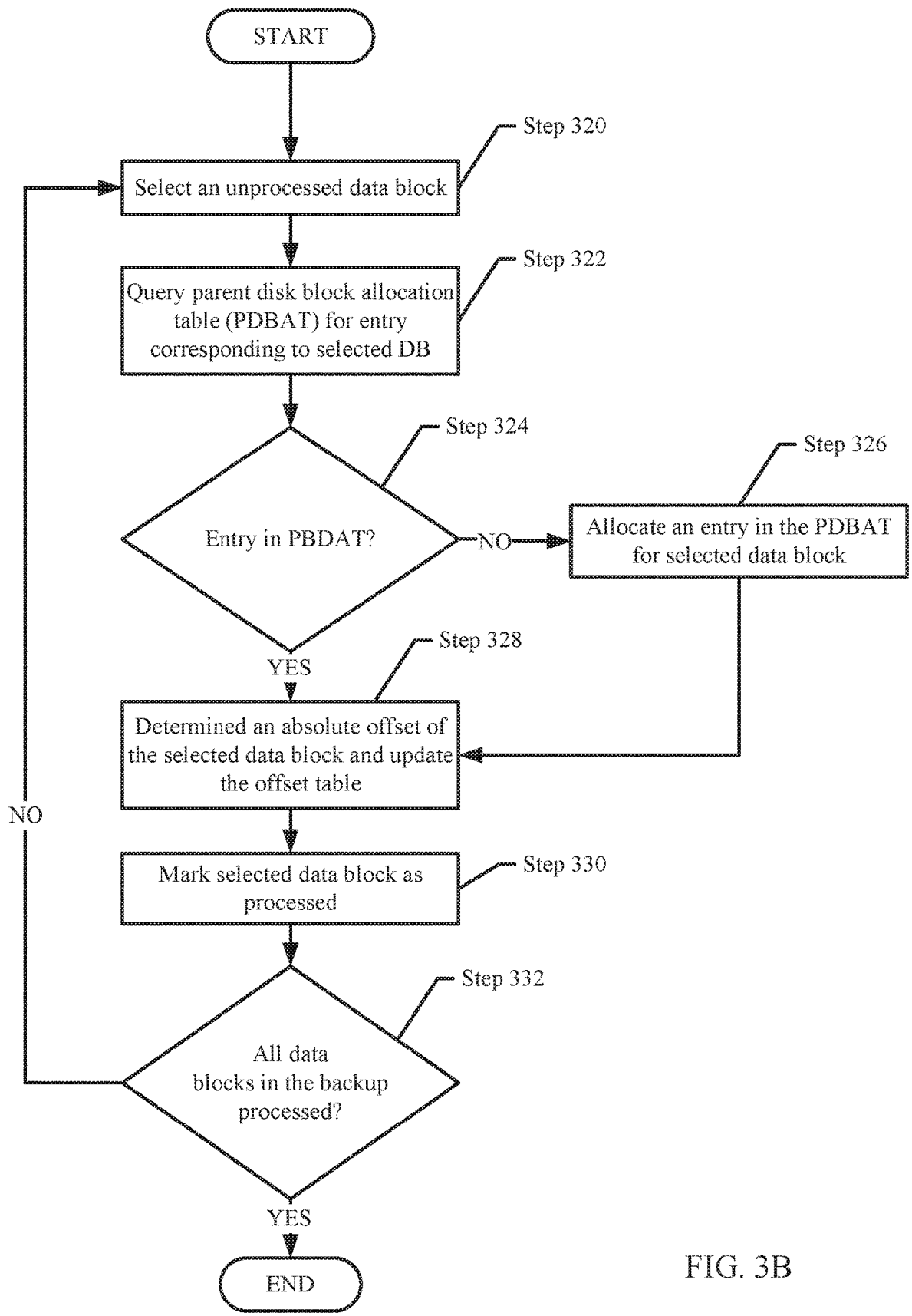
FIG. 3B shows a flowchart for performing a data allocation analysis in accordance with one or more embodiments of the invention.

In one or more embodiments of the invention, the data allocation analysis is performed via the method illustrated in FIG. 3B. The data allocation analysis may be performed via other methods without departing from the invention.

In one or more embodiments of the invention, a notification regarding the outcome of the data allocation analysis may be performed may be sent to a backup storage. In response, the backup storage may allocate a container for storing of a backup. The container may be allocated based on the notification. The container may be a data structure for storing the backup. The container may have a size corresponding to the size of the backup, metadata associated with the backup, and/or an allocation table associated with the backup.

In Step 308, the backup is divided into sub-portions based on: (i) a number of available data streams between the production host and a backup storage, (ii) a bandwidth of each data stream, and (iii) the offset table. The number of data streams may be used to determine a number of sub-portions in which to divide the backup. The bandwidth of each data stream may be used to determine a size of each sub-portion. The offset table may be used to determine how to group the data blocks into sub-portions. For example, data blocks with offsets similar to each other may be grouped in the same sub-portion. Other heuristics may be used to divide the data blocks into sub-portions without departing from the invention.

Figure 3C:
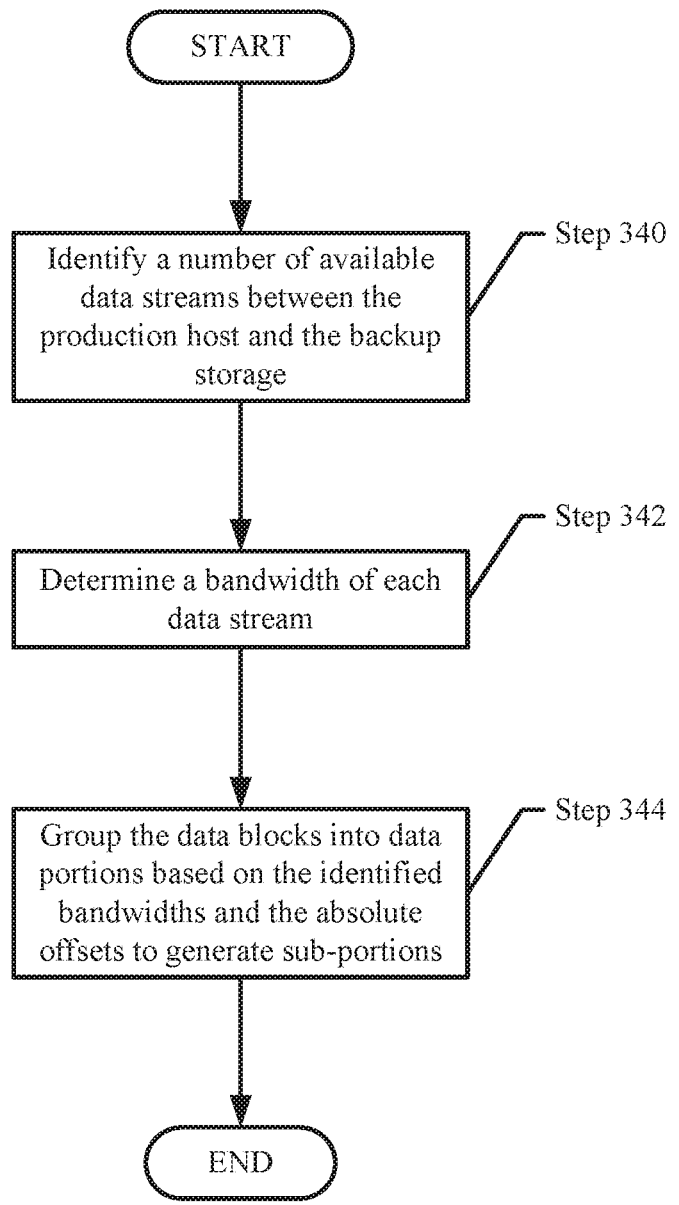
FIG. 3C shows a flowchart for dividing a backup into sub-portions in accordance with one or more embodiments of the invention.

In one or more embodiments of the invention, the backup is divided via the method illustrated in FIG. 3C. The backup may be divided via other methods without departing from the invention.

In one or more embodiments of the invention, a notification regarding the sub-portions may be sent to the backup storage. In response, the backup storage may subdivide a container into a corresponding number of sub-portions for storing of each of the sub-portions of the backup.

In Step 310, each sub-portion is sent, to the backup storage, via the data stream identified in Step 308. The individual sub-portions may be sent serially, in parallel, or in some combination thereof to the backup storage. Additionally, the offset table, or another data structure that includes information that specifies the write locations for each data block of the backup, is also sent to the backup storage. Using the offset table, the individual sub-portions are stored in the appropriate locations within the backup storage. Thus, once all data associated with all of the sub-portions are received by the backup storage, the complete backup is stored on the backup storage where each sub-portion is in the correct location within the backup. Alternatively, the arrangement of the sub-portions may be different from that of the backup generated by the production host but the offset table, or another data structure, may logically specify the relationship between the arrangement of the sub-portions in the backup storage and the arrangement of the sub-portions in the generated backup.

In one or more embodiments of the invention, each of the sub-portions may be stored in each of the corresponding sub-portions of the container in the backup storage. Each of the sub-portions of the container may be written to in a parallel or partially overlapping in time manner. By doing so, the time required to store all of the sub-portions in the container may be reduced in comparison to contemporary scenarios in which each sub-portion may be written to a container in a serial manner.

FIG. 3B shows a flowchart for performing a data allocation analysis in accordance with one or more embodiments of the invention. The method shown in FIG. 3B may be performed by, e.g., a production agent (132, FIG. 1). Other components of the system illustrated in FIG. 1 may perform the methods of FIG. 3B without departing from the invention.

In Step 320, an unprocessed data block is selected from the data blocks identified as being part of the backup in step 304.

In Step 322, the parent disk block allocation table (PDBAT) is quarried for an entry corresponding to the selected data block.

In Step 324, a determination is made about whether there is an entry in the PDBAT corresponding to the selected data block based on the query in Step 322. If there is an entry in the PDBAT corresponding to the selected data block, then the method proceeds to step 328; otherwise, the method proceeds to step 326.

In Step 326, an entry in the PDBAT is allocated for the selected data block. The entry may be allocated by either (i) identifying a current entry that may be overwritten and/or reused for the selected data block in the PDBAT or (ii) creating a new entry (e.g., at the end of the PDBAT) for the selected data block in the PDBAT. The manner in which the allocation of the entry is performed may be determined, for example, based on the disk format (e.g., Virtual Hard Disk X (VHDX), VHD, etc.) of a disk hosting the unprocessed data block.

In Step 328, an absolute offset of the selected data block is determined and used to update the offset table. The absolute offset may be determined using the entry corresponding to the selected data block in the PDBAT. As discussed above, the entry corresponding to the selected data block may correspond to an entry that was created prior to Step 300 or created in Step 326. The absolute offset, which may also be referred to as a physical address, may be stored in an entry of the offset table.

In Step 330, the selected data block is marked as processed.

In Step 332, a determination is made about whether all data blocks in the backup have been processed. If all data blocks in the backup have not been processed, the method proceeds to step 320; otherwise, the method ends.

FIG. 3C shows a flowchart for dividing a backup into sub-portions in accordance with one or more embodiments of the invention. The method shown in FIG. 3C may be performed by, for example, a production agent. Other components of the system illustrated in FIG. 1 may perform the method of FIG. 3C without departing from the invention.

In Step 340, a number of available data streams between the production host and the backup storage are identified. The available data streams may be identified by searching any connections between the production host and the backup storage. Once identified, the operational performance of the identified data streams may be validated by sending and/or obtaining data via the data streams to verify that the connections are functioning as expected.

In Step 342, a bandwidth of each data stream is determined. The bandwidth of a data stream may be identified by sending a file of known size along the data stream to the backup storage and identifying a time it takes for the data to download in the backup storage. Other forms of measuring bandwidth may be performed without departing from the invention. Alternatively, the bandwidth of each data stream may be determined by querying a database, or manager, of the data streams that maintains records regarding the quality of each of the data streams.

In Step 344, the data blocks are grouped based on the bandwidths and the absolute offsets to generate sub-portions. In one or more embodiments of the invention, the bandwidths are used to determine a size of each sub-portion. For example, different data streams may have different bandwidths. Each of the sub-portions, to be sent via different data streams, may be sized proportionally to the bandwidth of each of the data streams. By doing so, each portion sent via the data streams may complete transmission in approximately the same duration of time. Alternatively, the size of each of the sub-portions may be the total size of the backup divided by the number of data streams without consideration for the relative bandwidth of each of the data streams. In a still further example, only data streams supporting a predetermined minimum bandwidth may be used for sending the sub-portions. In this scenario, the size of each of the sub-portions may be the total size of the backup divided by the number of data streams having a bandwidth that exceeds the predetermined minimum bandwidth.

In one or more embodiments of the invention, the absolute offset of each data block is used to determine how to group the data blocks into each of the sub-portions. Data blocks with absolute offsets that are near to each other may be grouped together. Said another way, the data blocks are grouped together such that the data blocks associated with a given sub-portion are contiguous or near-contiguous portion of the physical disk. By doing so, the seek time of the physical disks used for sending each of the sub-portions may be reduced when compared to grouping the sub-portions for sending based on other characteristics of the sub-portions. The number of data blocks included in each of the sub-portions may be determined such that each of the sub-portions includes the quantity of data determined by the bandwidth analysis of each of the data streams, as discussed above.

Example

Figure 4A:
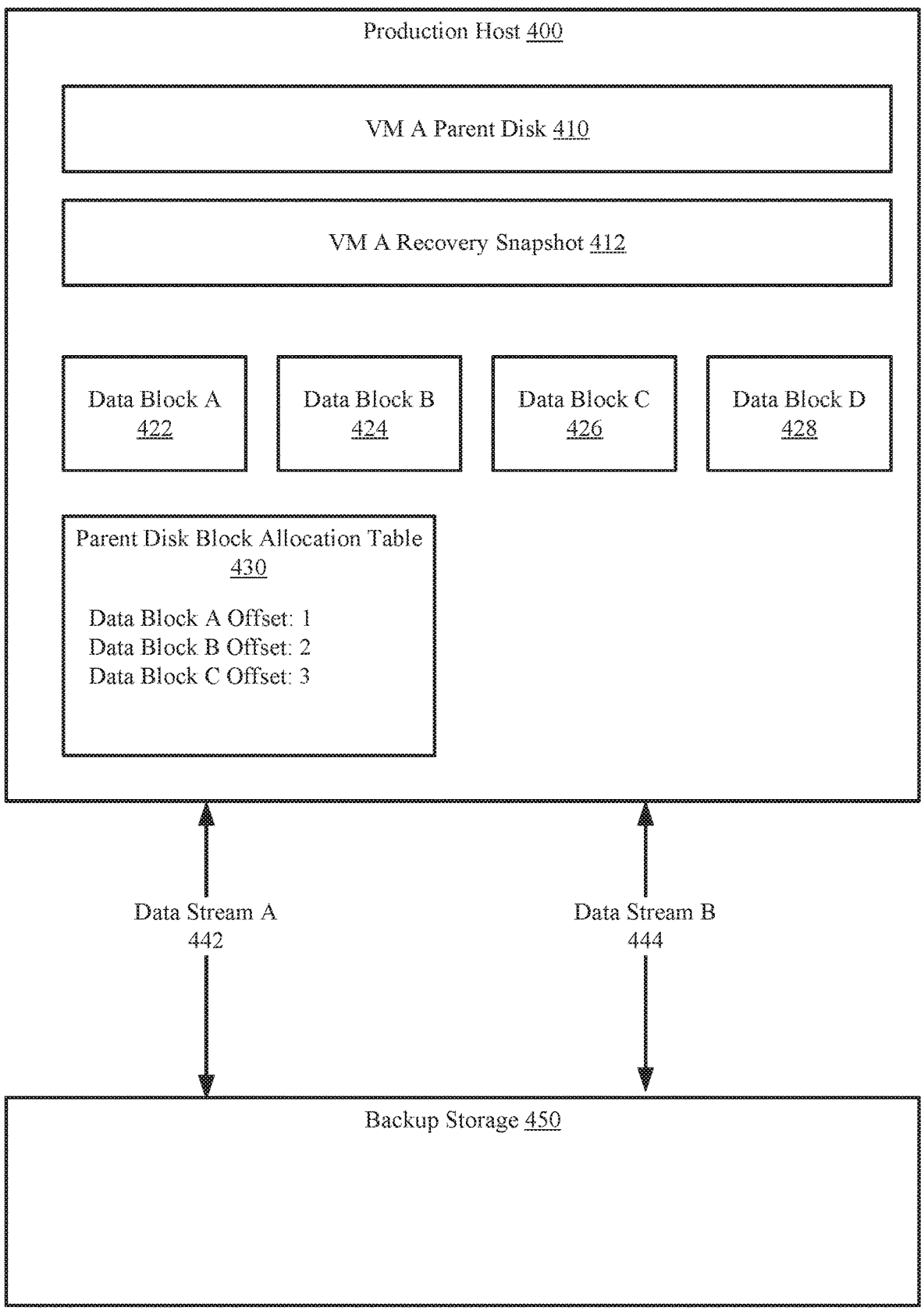
FIGS. 4A-4B show an example in accordance with one or more embodiments of the invention.

The following section describes an example. The example is not intended to limit the invention. Turning to the example, consider a scenario in which a backup is requested for a virtual machine. FIG. 4A shows an example system including a production host (400) connected to a backup storage (450). In FIG. 4A, the data stored in persistent storage of the production host (400) and the backup storage (450) are shown. In this system, the production host (400) and the backup storage (450) are connected by two data streams (442, 444) of equal bandwidth. The production host may perform the methods of FIGS. 3A-3C to generate a backup to be sent to the backup storage (450).

Specifically, the production host, in response to a backup generation request, may generate a recovery snapshot (412) of a VM parent disk (410). The VM recovery snapshot (412) may include four data blocks (e.g., 422, 424, 426, 428) modified during a time period after the parent disk transitioned to read-only mode. The data blocks (e.g., 422, 424, 426, 428) are the portion of data from the recovery snapshot (412) to be sent to the backup storage. Each of the data blocks (e.g, 422, 424, 426, 428) may be of identical size. Data blocks A-C (422, 424, 426) may be modifications of previously existing data blocks in the parent disk (410). Data block D (428) may be a data block added after the parent disk (410) transitioned to read-only mode and is not a modification of a data block in the parent disk (410).

The production host (400) may store a parent disk block allocation table (430) that includes an entry for data blocks A-C (422, 424, 426), which each include an associated logical location of the data block. Because data block D (428) was added after the parent disk (410) entered read-only mode, the parent disk block allocation table (430) includes any entry for data block D (428).

Figure 4B:
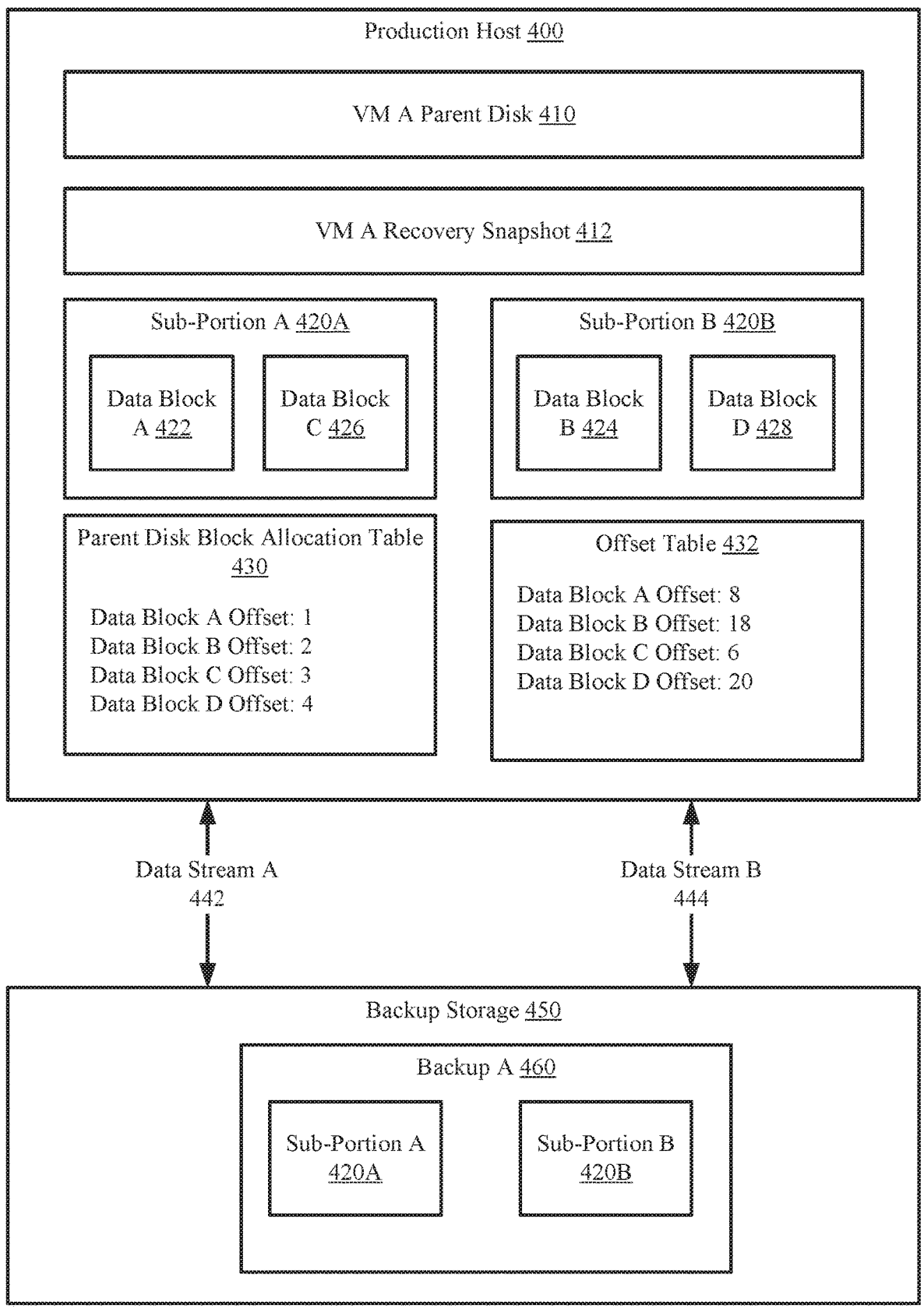

Continuing with the methods illustrated in FIGS. 3A-3C, the production host (400) may generate an offset table that specifies an absolute offset of each of the data blocks (e.g., 422, 424, 426, 428) to be sent to the backup storage (450). In FIG. 4B, the offset table (432) includes an entry for each data block A-D (422, 424, 426, 428), which specifies an absolute offset of the corresponding data block.

Due to the equal bandwidth of the data streams (442, 444) and the equal sizes of the data blocks (e.g., 422, 424, 426, 428), the data blocks may be grouped into two sub-portions (420A, 420B), each including two data blocks. Because data block A (422) and data block C (426) have absolute offsets that are near each other, sub-portion A (420A) includes data blocks A and C (422, 426). This may result in the two remaining data blocks (e.g., 424, 428) to be included in sub-portion B (420B) so that each of the sub-portions (420A, 420B) includes approximately the same quantity of data.

Each of the sub-portions (420A, 420N) is sent in parallel to the backup storage (450) in parallel via the data stream (442, 444). Once received, the backup (460) is stored in the backup storage (450). The offset table (432) is also sent to the backup storage (450). The offset table is used to store the each sub-portion in the appropriate location in the backup storage such that when all the sub-portions are received and stored on the backup storage, that the resulting data corresponds to the backup (i.e., the backup as it existed on the production host prior to being divided in to sub-portions and transferred to the backup storage).

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention may improve the efficiency of storing data by processing the data that is to be transferred in a manner that allows it to be sub-divided into smaller portions that are transferred in parallel, or a partially overlapping in time manner, to the backup storage. Once received by the backup storage, the smaller portions may be recombined to generate the data. Thus, embodiments of the invention may decrease the time required to transmit a large amount of data by enabling sub-division of the data along with subsequent reconstruction of the data on the backup storage.

Thus, embodiments of the invention may address the problem of inefficient use of computing resources in a distributed computing environment. This problem arises due to the technological nature of the environment in which backup services are implemented.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for processing backup generation requests, the method comprises:
   receiving, by a production host agent executing on a production host, a backup generation request;
   in response to receiving the backup generation request:
      identifying a backup to transfer to a backup storage, wherein the backup comprises a plurality of data blocks stored in persistent storage on the production host;
      performing a data allocation analysis on the backup to generate an offset table, wherein the offset table specifies an absolute offset of each of the plurality of data blocks in the backup;
      dividing the backup into a plurality of sub-portions based on at least the offset table and bandwidths associated with at least two data streams,
         wherein a sub-portion of the plurality of sub-portions comprises at least two of the plurality of data blocks,
         wherein the at least two of the plurality of data block are associated with the sub-portion based on the offset table specifying that the at least two of the plurality of blocks are contiguously located in the persistent storage on the production host;
      transferring, using the at least two data streams, at least two of the plurality of sub-portions to the backup storage,
         wherein all data blocks associated with the sub-portion are transferred using a data stream of the at least two data streams, and
         wherein each of the at least two data streams is associated with a distinct portion of a container on the backup storage,
         wherein the at least two data streams transfer data blocks in parallel to the container, and
      transferring the offset table to the backup storage.

2. The method of claim 1, further comprising:
   prior to generating the backup:
      generating a recovery snapshot of a virtual machine, wherein the identifying the backup comprises identifying at least a portion of the recovery snapshot as the backup.

3. The method of claim 2, wherein generating the recovery snapshot of the virtual machine comprises writing received data to the virtual snapshot for the virtual machine from a point in time in which a parent disk of the virtual machine was placed in a read-only mode.

4. The method of claim 1, wherein performing the data allocation analysis comprises:
   selecting a data block associated with the backup;
   determining that an entry associated with the data block is not present in a parent disk block allocation table (PDBAT), wherein the PDBAT is associated with a virtual machine and wherein the data block is associated with the virtual machine; and
   allocating an entry in the PDBAT for the data block, wherein the offset table is generated using the PDBAT.

5. The method of claim 4, wherein allocating the entry in the PDBAT comprises allocating an existing entry in the PDBAT.

6. The method of claim 4, wherein allocating the entry in the PDBAT comprises allocating new entry in the PDBAT.

7. The method of claim 4, wherein allocating the entry in the PDBAT is based, at least in part, on a file format of a disk utilized by the virtual machine.

8. A system for processing backup generation requests, the system comprising:
   a production host executing a virtual machine; and
   a backup storage configured to store backups;
   wherein the production host is configured to:
      receive a backup generation request;
      in response to receiving the backup generation request:
         identify a backup to transfer to the backup storage, wherein the backup comprises a plurality of data blocks stored in persistent storage on the production host;
         perform a data allocation analysis on the backup to generate an offset table, wherein the offset table specifies an absolute offset of each of the plurality of data blocks in the backup;
         divide the backup into a plurality of sub-portions based on at least the offset table and bandwidths associated with at least two data streams,
            wherein a sub-portion of the plurality of sub-portions comprises at least two of the plurality of data blocks,
            wherein the at least two of the plurality of data block are associated with the sub-portion based on the offset table specifying that the at least two of the plurality of blocks are contiguously located the persistent storage on the production host;
         transfer, using the at least two data streams, at least two of the plurality of sub-portions to the backup storage,
            wherein all data blocks associated with the sub-portion are transferred using a data stream of the at least two data streams, and
            wherein each of the at least two data streams is associated with a distinct portion of a container on the backup storage,
            wherein the at least two data streams transfer data blocks in parallel to the container, and
         transferring the offset table to the backup storage.

9. The system of claim 8, further comprising:
   prior to generating the backup:
      generating a recovery snapshot of a virtual machine, wherein the identifying the backup comprises identifying at least a portion of the recovery snapshot as the backup.

10. The system of claim 9, wherein generating the recovery snapshot of the virtual machine comprises writing received data to the virtual snapshot for the virtual machine from a point in time in which a parent disk of the virtual machine was placed in a read-only mode.

11. The system of claim 8, wherein performing the data allocation analysis comprises:
    selecting a data block associated with the backup;
    determining that an entry associated with the data block is not present in a parent disk block allocation table (PDBAT), wherein the PDBAT is associated with a virtual machine and wherein the data block is associated with the virtual machine; and allocating an entry in the PDBAT for the data block, wherein the offset table is generated using the PDBAT.

12. The system of claim 11, wherein allocating the entry in the PDBAT comprises allocating an existing entry in the PDBAT.

13. The system of claim 11, wherein allocating the entry in the PDBAT comprises allocating new entry in the PDBAT.

14. The system of claim 11, wherein allocating the entry in the PDBAT is based, at least in part, on a file format of a disk utilized by the virtual machine.

15. A non-transitory computer readable medium comprising computer readable program code, which when executed by a computer processor enables the computer processor to perform a method, the method comprising:
   receiving, by a production host agent executing on a production host, a backup generation request;
   in response to receiving the backup generation request:
      identifying a backup to transfer to a backup storage, wherein the backup comprises a plurality of data blocks stored in persistent storage on the production host;
      performing a data allocation analysis on the backup to generate an offset table, wherein the offset table specifies an absolute offset of each of the plurality of data blocks in the backup;
      dividing the backup into a plurality of sub-portions based on at least the offset table and bandwidths associated with at least two data streams,
         wherein a sub-portion of the plurality of sub-portions comprises at least two of the plurality of data blocks,
         wherein the at least two of the plurality of data block are associated with the sub-portion based on the offset table specifying that the at least two of the plurality of blocks are contiguously located in the persistent storage on the production host;
      transferring, using at least two data streams, at least two of the plurality of sub-portions to the backup storage, wherein all data blocks associated with the sub-portion are transferred using a data stream of the at least two data streams, and
         wherein each of the at least two data streams is associated with a distinct portion of a container on the backup storage,
         wherein the at least two data streams transfer data blocks in parallel to the container, and
      transferring the offset table to the backup storage.

16. The non-transitory computer readable medium of claim 15, further comprising:
   prior to generating the backup:
      generating a recovery snapshot of a virtual machine,
         wherein the identifying the backup comprises identifying at least a portion of the recovery snapshot as the backup.

17. The non-transitory computer readable medium of claim 15, wherein performing the data allocation analysis comprises:
   selecting a data block associated with the backup;
   determining that an entry associated with the data block is not present in a parent disk block allocation table (PDBAT), wherein the PDBAT is associated with a virtual machine and wherein the data block is associated with the virtual machine; and
   allocating an entry in the PDBAT for the data block, wherein the offset table is generated using the PDBAT.

18. The non-transitory computer readable medium of claim 17, wherein allocating the entry in the PDBAT comprises allocating an existing entry in the PDBAT.

19. The non-transitory computer readable medium of claim 17, wherein allocating the entry in the PDBAT comprises allocating new entry in the PDBAT.

20. The non-transitory computer readable medium of claim 17, wherein allocating the entry in the PDBAT is based, at least in part, on a file format of a disk utilized by the virtual machine.

* * * * *